(12) United States Patent
Shmulevich et al.

(10) Patent No.: US 9,037,983 B1
(45) Date of Patent: May 19, 2015

(54) USER PRIVILEGE BASED WEB PAGE CONTENT EDITING

(75) Inventors: Igor Shmulevich, San Ramon, CA (US); John Huang, Dublin, CA (US); Andy Simmons, Montara, CA (US); Gary Tang, Santa Clara, CA (US)

(73) Assignee: EMC Corporation, Hopkinton, MA (US)

( * ) Notice: Subject to any disclaimer, the term of this patent is extended or adjusted under 35 U.S.C. 154(b) by 475 days.

(21) Appl. No.: 11/638,857

(22) Filed: Dec. 13, 2006

(51) Int. Cl.
*G06F 3/00* (2006.01)
*G06F 3/048* (2013.01)

(52) U.S. Cl.
CPC . *G06F 3/00* (2013.01); *G06F 3/048* (2013.01)

(58) Field of Classification Search
CPC .......................................................... G06F 3/00
USPC ........................................................ 715/760
See application file for complete search history.

(56) References Cited

U.S. PATENT DOCUMENTS

| | | | |
|---|---|---|---|
| 5,937,160 A | 8/1999 | Davis et al. | |
| 6,092,074 A | 7/2000 | Rodkin et al. | |
| 6,247,032 B1 | 6/2001 | Bernardo et al. | |
| 6,343,302 B1 | 1/2002 | Graham | |
| 6,557,013 B1 | 4/2003 | Ziff et al. | |
| 6,560,639 B1 | 5/2003 | Dan et al. | |
| 6,611,835 B1 | 8/2003 | Huang et al. | |
| 6,750,885 B1 * | 6/2004 | Finch et al. | 715/777 |
| 6,842,782 B1 | 1/2005 | Malik et al. | |
| 6,961,905 B1 | 11/2005 | Cover et al. | |
| 7,062,506 B2 | 6/2006 | Taylor et al. | |
| 7,143,344 B2 * | 11/2006 | Parker et al. | 715/236 |
| 7,194,469 B1 | 3/2007 | Dowd et al. | |
| 7,194,680 B1 | 3/2007 | Roy et al. | |
| 7,237,002 B1 | 6/2007 | Estrada et al. | |
| 7,316,003 B1 | 1/2008 | Dulepet et al. | |
| 7,383,320 B1 | 6/2008 | Silberstein et al. | |
| 7,401,083 B2 * | 7/2008 | Daemke et al. | 1/1 |
| 7,668,913 B1 | 2/2010 | Underwood et al. | |
| 7,827,075 B2 | 11/2010 | Hess et al. | |
| 8,156,141 B1 | 4/2012 | Shmulevich et al. | |
| 2002/0046244 A1 | 4/2002 | Bimson et al. | |
| 2002/0046245 A1 | 4/2002 | Hillar et al. | |
| 2002/0091725 A1 | 7/2002 | Skok | |
| 2002/0140730 A1 | 10/2002 | Linsey et al. | |
| 2002/0161603 A1 * | 10/2002 | Gonzales | 705/1 |
| 2002/0184255 A1 | 12/2002 | Edd et al. | |
| 2003/0023632 A1 | 1/2003 | Ries et al. | |
| 2003/0028801 A1 * | 2/2003 | Liberman et al. | 713/200 |

(Continued)

OTHER PUBLICATIONS

Red Dot: "web content management": http://www.reddot.com/products_web_content_management_smartedit.htm as found on http://www.archive.org , dated Jan. 1, 2006, Relevant pp. 1.

(Continued)

*Primary Examiner* — Doon Chow
*Assistant Examiner* — Le Nguyen
(74) *Attorney, Agent, or Firm* — Van Pelt, Yi & James LLP

(57) ABSTRACT

Selectively restricting changes to a web page is disclosed. It is determined whether a current user is to be limited to editing content. If it is determined that the current user is to be limited to editing content, an interface that enables the current user to edit a content data but not an associated layout data of the web page is displayed to the user, based at least in part on the determination.

19 Claims, 6 Drawing Sheets

(56) References Cited

U.S. PATENT DOCUMENTS

| | | | |
|---|---|---|---|
| 2003/0033378 A1 | 2/2003 | Needham et al. | |
| 2003/0074634 A1 | 4/2003 | Emmelmann | |
| 2003/0101255 A1* | 5/2003 | Green | 709/223 |
| 2003/0163519 A1 | 8/2003 | Kegel et al. | |
| 2003/0177200 A1 | 9/2003 | Laughlin et al. | |
| 2003/0196171 A1 | 10/2003 | Distefano, III | |
| 2003/0204811 A1 | 10/2003 | Dam et al. | |
| 2004/0006747 A1 | 1/2004 | Tyler | |
| 2004/0019634 A1 | 1/2004 | Van Geldern et al. | |
| 2004/0019853 A1* | 1/2004 | Takizawa et al. | 715/523 |
| 2004/0125130 A1 | 7/2004 | Flamini et al. | |
| 2004/0148318 A1 | 7/2004 | Taylor et al. | |
| 2004/0148565 A1 | 7/2004 | Davis et al. | |
| 2004/0148576 A1 | 7/2004 | Matveyenko et al. | |
| 2004/0205529 A1 | 10/2004 | Poulose et al. | |
| 2004/0205659 A1 | 10/2004 | Barry et al. | |
| 2004/0215719 A1 | 10/2004 | Altshuler | |
| 2004/0217985 A9 | 11/2004 | Ries et al. | |
| 2004/0225658 A1* | 11/2004 | Horber | 707/9 |
| 2005/0050462 A1* | 3/2005 | Whittle et al. | 715/517 |
| 2005/0108418 A1 | 5/2005 | Bedi et al. | |
| 2005/0171947 A1 | 8/2005 | Gautestad | |
| 2005/0229101 A1 | 10/2005 | Matveyenko et al. | |
| 2005/0246627 A1 | 11/2005 | Sayed | |
| 2005/0262427 A1 | 11/2005 | Cantwell et al. | |
| 2006/0031404 A1 | 2/2006 | Kassab et al. | |
| 2006/0123348 A1* | 6/2006 | Ross et al. | 715/751 |
| 2006/0129635 A1 | 6/2006 | Baccou et al. | |
| 2006/0235984 A1 | 10/2006 | Kraus et al. | |
| 2006/0248442 A1 | 11/2006 | Rosenstein et al. | |
| 2007/0094603 A1* | 4/2007 | Yli-Urpo | 715/741 |
| 2007/0162845 A1* | 7/2007 | Cave et al. | 715/530 |
| 2007/0180359 A1* | 8/2007 | Giannetti | 715/513 |
| 2007/0186170 A1 | 8/2007 | Carter, II | |
| 2007/0192140 A1* | 8/2007 | Gropper | 705/3 |
| 2007/0208773 A1 | 9/2007 | Tsao | |
| 2007/0209005 A1* | 9/2007 | Shaver et al. | 715/733 |
| 2007/0234359 A1* | 10/2007 | Bernabeu-Auban et al. | 718/100 |
| 2007/0239726 A1 | 10/2007 | Weiss et al. | |
| 2008/0005125 A1 | 1/2008 | Gaedeke | |
| 2008/0005282 A1 | 1/2008 | Gaedcke | |
| 2008/0010425 A1 | 1/2008 | Funk et al. | |
| 2008/0040425 A1 | 2/2008 | Hines | |
| 2008/0040661 A1* | 2/2008 | Curtis et al. | 715/243 |
| 2009/0077670 A1 | 3/2009 | Schireson | |

OTHER PUBLICATIONS

Interwoven: "Products".: http://www.interwoven.com/products/content_management/index.html as found on http:// archive.org , dated Dec. 5, 2006, Relevant pp. 1.

Typo 3: "Feature List".: http://typo3.com/Feature_list.1243.0.html , as found on http://archive.org , dated Dec. 5, 2006, Relevant pp. 1-10.

Tridion: "Content Creation". http://www.tridion.com/Products/R5/ContentCreation.asp , Dec. 5, 2006, Relevant p. 1.

Zip Zap: "Update and Build your Web Site Online via your Web Browser": http://www.zipzap.biz/webeditonline.html, as found on http://www.archive.org , dated Feb. 6, 2005, Relevant pp. 1-2.

Zak Ruvalcaba, Macromedia Dreamweaver 8 Unleashed, Sams Publishing, Chapter 16: Working with Library Items, Oct. 7, 2005, p. 504-518.

* cited by examiner

USER PRIVILEGE BASED WEB PAGE CONTENT EDITING

BACKGROUND OF THE INVENTION

Software solutions for editing web pages have evolved from simple HTML editors to WYSIWYG (What you see is what you get) over the years, making it possible for users without HTML proficiency to create web pages. However, it still requires significant domain expertise to make a professional looking web page with various performance enhancing features.

With the wide adoption of the Internet in modern day work place, many businesses have a company website for external readers and internal websites (e.g., internal online documents) for employees. The content of such a website often needs to be updated by employees from different departments who are familiar with a specific subject but oftentimes not proficient in creating web pages. Furthermore, companies usually require the web pages throughout a website to have a uniform look and feel, and web pages on the same topic (e.g., product introductions) to follow a prescribed template/layout, with only the actual content (e.g., text and images) varying. Therefore, there is a need for a way to allow content contributors who do not have advanced skills to create and/or edit a web page that has a desired uniform appearance.

BRIEF DESCRIPTION OF THE DRAWINGS

The present invention will be readily understood by the following detailed description in conjunction with the accompanying drawings, and in which.

DETAILED DESCRIPTION

Figure 1A:
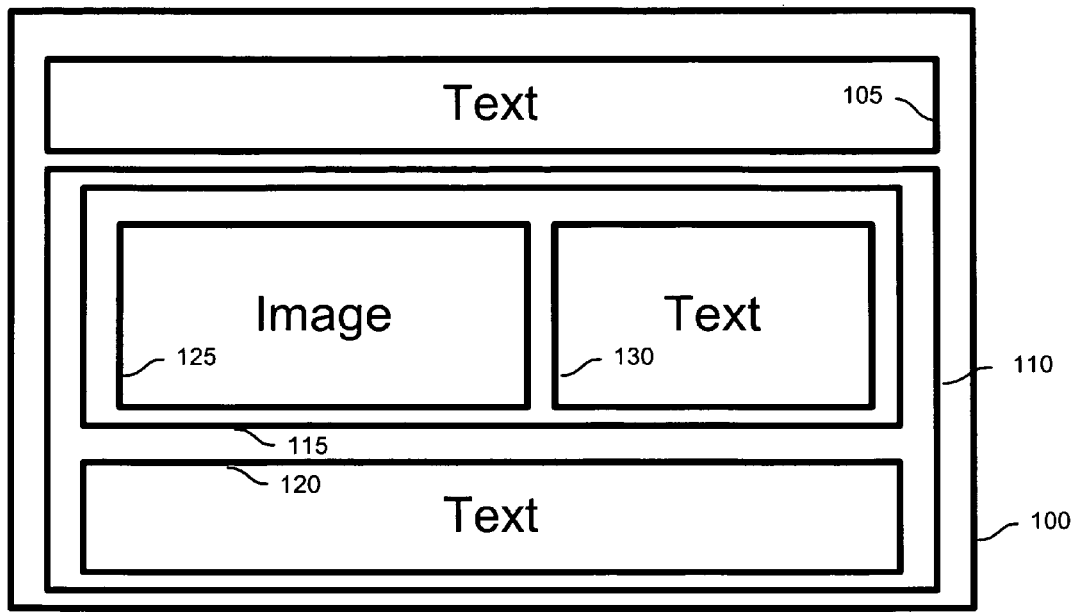
FIG. 1A shows an embodiment of a layout view.

The invention can be implemented in numerous ways, including as a process, a system, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Enabling a web page and/or template designer to lock the layout and/or other aspects of a web page and/or page template is disclosed. In some embodiments, users who are web page content contributors but who do not or may not have advanced web page design and/or layout skills are permitted to edit the content or a subset of the content of a web page. In some embodiments, content editing is limited based at least in part on a user's job function.

The sophistication of modern day enterprise software has enabled companies to automatically determine an employee's user permission based on his job function when he logs on to the company website internally. Therefore in an enterprise environment, the user permission information from the enterprise software in some embodiments is utilized by the web page solution to unlock the appropriate content if it is integrated with the backend enterprise software solution.

Displaying to a user based on the user's role and/or rights an interface that allows the user to edit all aspects of a web page, only the content (e.g., text and images) of a web page, or only a relevant subset of the content is disclosed. In some embodiments, at least certain layout elements of a web page are locked if a user's permission is determined to be limited to editing a content data. In some embodiments, a content view for editing only the content data of a web page is presented to web page content contributors and a layout view for editing both the layout data and the content data are made available to web page designers. The appropriate view(s) is/are displayed based on whether a user is limited to editing only the content. In some embodiments, the content of a web page or selected portions thereof may be locked, in addition to the layout data, if a user is limited to editing only part of the content.

In some embodiments, the layout data of a web page are displayed in a user interface as nested components, each of which either encloses a content data or a group of other components. In some embodiments, when a layout component is locked/unlocked, all the layout components and content that are nested in that component likewise are locked/unlocked.

FIG. 1A shows an embodiment of a layout view. A web page is enclosed by a layout component 100, which is divided horizontally into a layout component 105 and a layout component 110. Layout component 105 encloses a text content. Layout component 110 is further divided horizontally into a layout component 115 and a layout component 120. Layout component 120 also encloses a text content. Layout component 115 is further divided vertically into a layout component 125 and a layout component 130. Layout component 125 encloses an image content while layout component 130 encloses a text content.

FIG. 1A demonstrates how layout components and content are nested hierarchically. In the example shown, all the layout components and content elements are children of the top level layout component 100. The image content is a child of layout component 125, which itself is a child of layout component 115, which in turn is a child of layout component 110, parented by layout component 100. If layout component 115 is locked (layout and content both locked), in some embodiments layout components 125 and 130 alongside with their enclosed content will be locked as well.

Locking web page layout while permitted associated content to be edited is disclosed. In the example shown in FIG. 1A, if a "layout only" lock were specified for layout component 115, at least some users (e.g., web page content contributors) would be prevented from viewing and/or editing layout information for component 115 and associated child layout components 125 and 130, but would be permitted to edit the image content of component 125 and/or the text content of component 130.

Figure 1B:
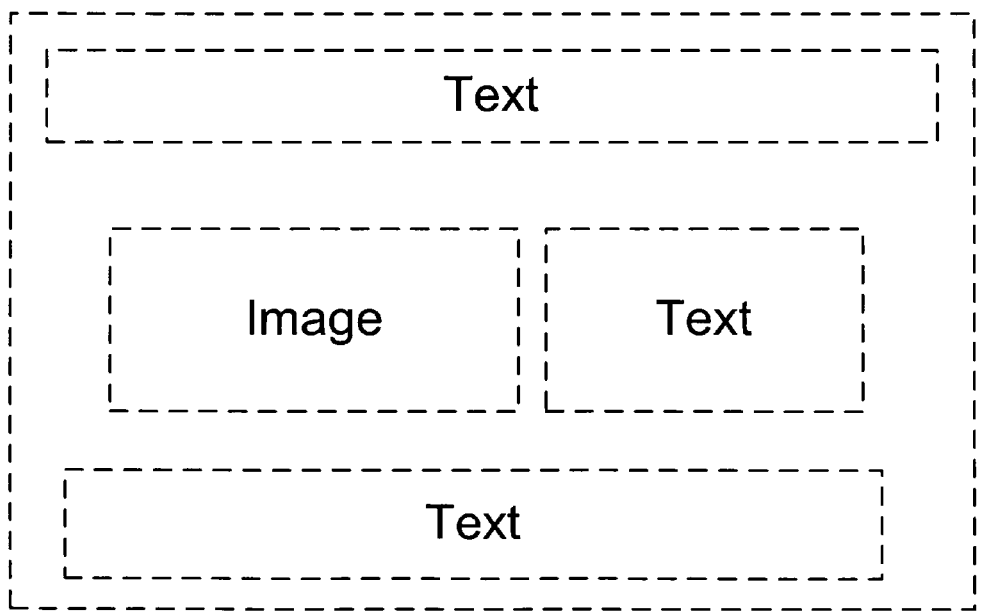
FIG. 1B shows an embodiment of a content view.

FIG. 1B shows an embodiment of a content view. It shows the same content data as FIG. 1A does without the layout components. In some embodiments, the content view of FIG. 1B is displayed to a web page content contributor who is not permitted to change web page layout, e.g., to prevent deviations from a prescribed layout. A user interacting with a web page editing application or tool via the content view is only able to alter the content without changing the actual layout of the web page.

Figure 2:
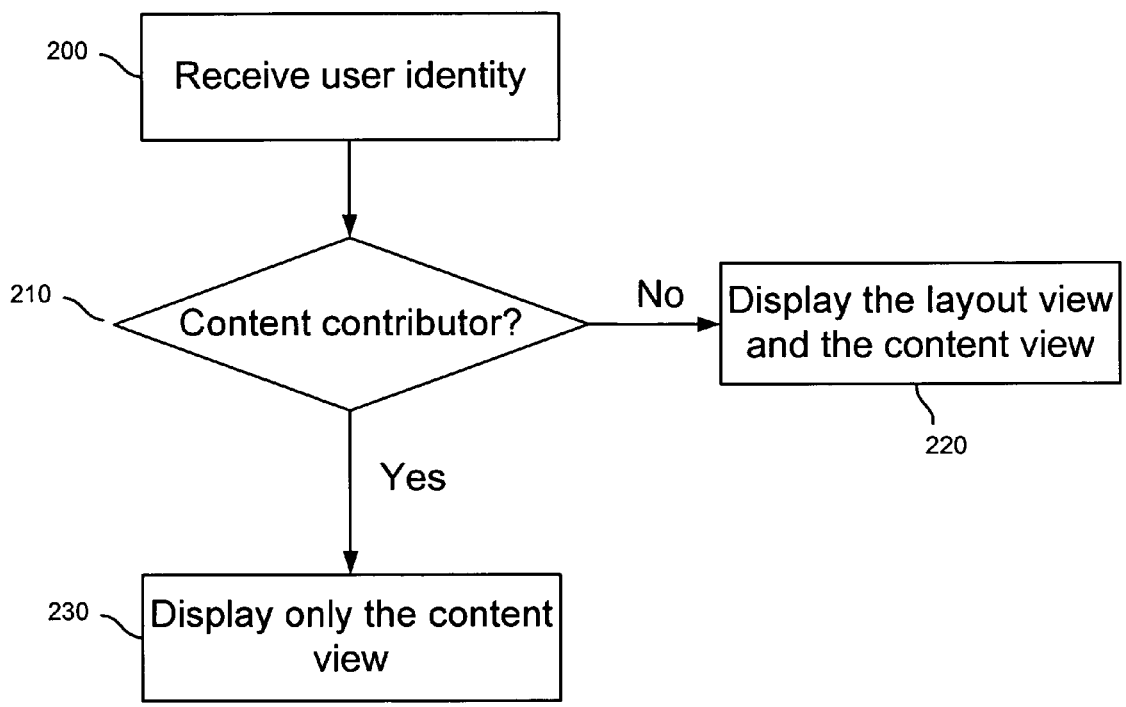
FIG. 2 is a flowchart illustrating a process used in one embodiment to determine which view to display.

FIG. 2 is a flowchart illustrating a process used in one embodiment to determine which view to display. When a user requests to update a web page, his identity is received (200), based on which his job function is determined. If he is a content contributor (210), only the content view will be displayed (230). On the other hand, if he is not a content contributor (210), both the layout view and the content view will be displayed (220), giving him the privilege to edit both the content and the layout.

Figure 3:
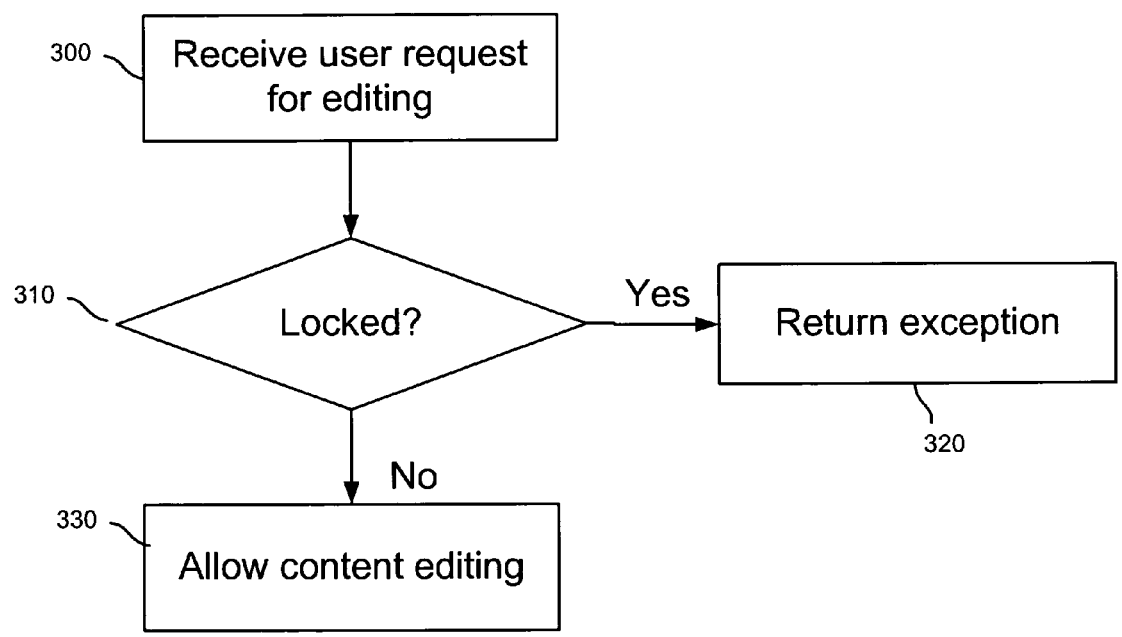
FIG. 3 is a flowchart illustrating a process used in one embodiment by a content view.

FIG. 3 is a flowchart illustrating a process used in one embodiment to provide a content view. In some embodiments, the process of FIG. 3 is used to provide and enforce the ability of a web page designer to prevent editing of selected web page content, such as a company logo, while permitting other content to be edited. In some embodiments, a designer locks via a graphical user interface and/or control, selected content elements, which results in content contributors not being able to change the locked content when editing the web page in the content view. In the example shown in FIG. 3, when a user tries to edit an element content in a content view (300), it is determined whether the content is locked (310). If the content is locked, an exception is returned to indicate to the user that he/she is not permitted to change the content (320). Otherwise, content editing is allowed (330).

Figure 4:
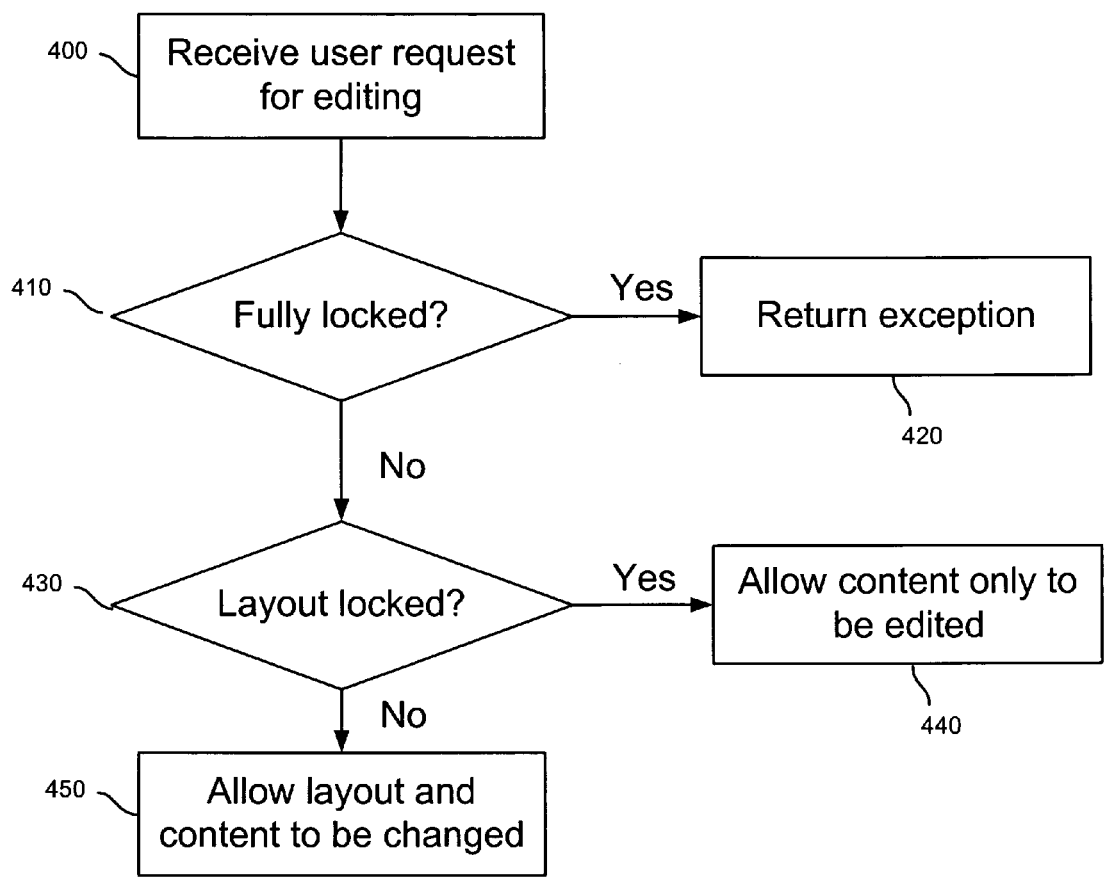
FIG. 4 is a flowchart illustrating a process used in one embodiment by a layout view.

FIG. 4 is a flowchart illustrating a process used in one embodiment to provide a layout view. In some embodiments, a web page and/or template designer is provided a graphical user interface or control that enables the designer to lock both the layout and content of a web page and/or component thereof or to instead lock just the layout. When a user tries to edit a web page in the layout view (400), the layout view checks if the both the layout and the content of the element(s) that the user is attempting to edit are locked (410). If so, an exception is returned to indicate no modification can be applied to this page. If not, the layout view checks if the layout is locked but the content is not (430). If so, the layout view will allow the enclosed content to be modified but not the layout (440). If the layout is not locked (430), both the layout components and their enclosed content can be changed (450).

Figure 5:
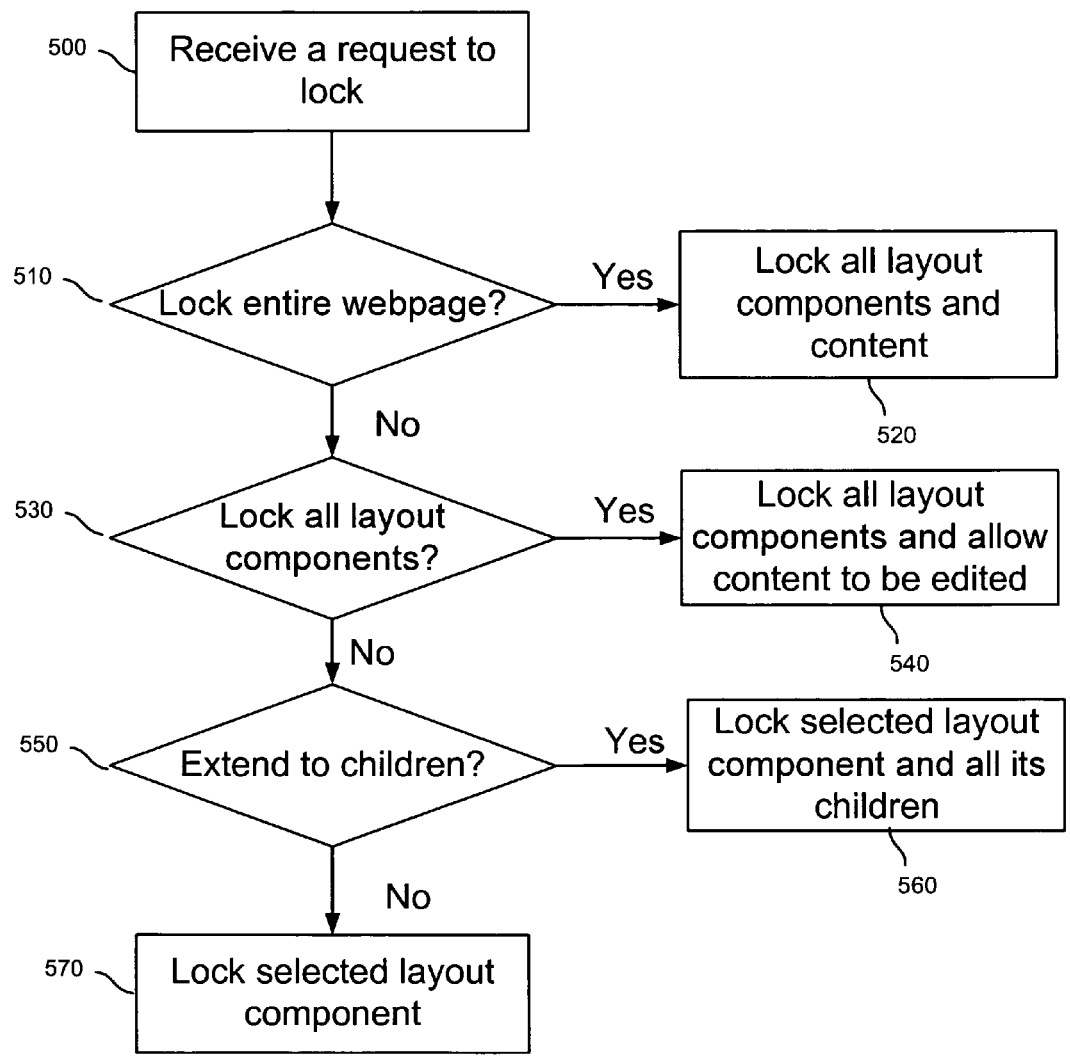
FIG. 5 is a flowchart illustrating a process used in one embodiment to implement a lock.

FIG. 5 is a flowchart illustrating a process used in one embodiment to implement a lock. There are several options for a user with higher privilege to protect information on a web page by locking it. He could opt to lock the entire web page (i.e. both the layout components and content), all the layout components without content, or a selected group of layout components and/or their enclosed content. When a lock request is received from a user (500), it is determined if the user wants to lock the entire web page (510) and if so, all layout components and content are locked (520). In some embodiments, this is implemented by locking the top level layout component and extending the lock down to all its children. If the user does not want to lock the entire web page (510), it is determined if the user wants to lock all the layout components while allowing content editing (530), and if so, all the layout components are locked while allowing content to be edited (540). If the user selects a specific group of layout components and content to be locked, it is determined if the lock should be extended to the children of their children and if so, the selected components and their children are locked (560). Otherwise only the selected layout component(s) or content is locked (570).

Figure 6:
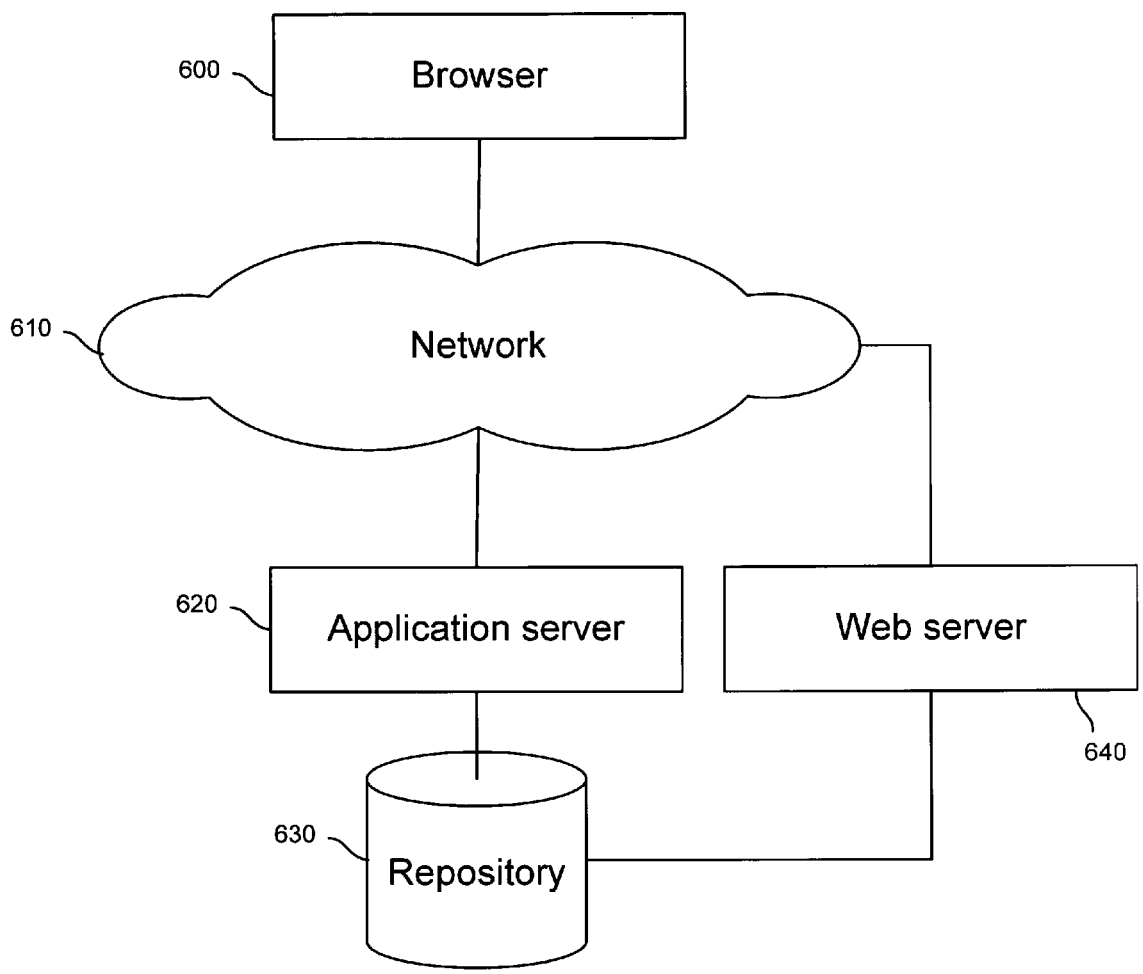
FIG. 6 shows an embodiment of a web page building application and associated storage and server elements.

FIG. 6 shows an embodiment of a web page building application and associated storage and server elements. In the example shown, a browser 600 is used to access via a network 610 a web page building application running on application server 620. The application server identifies the user and determines the user's privilege by checking a repository 630 where all user information resides. When the user tries to edit a web page stored on a web server 640, application server 620 checks the lock status of the web page through repository 630 and matches it with the user's privilege to determine which view(s) (layout/content) to display and which part of the web page the user is allowed to change. In some embodiments, changes to web page layout and/or content, if any, are saved to repository 630.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of selectively restricting changes to a web page, comprising:
    identifying a current user of an application server;
    automatically determining a job function associated with the current user by checking a repository where user information resides;
    determining a user right of the current user based at least in part based on the job function;
    using a processor to determine whether the current user is to be limited to editing the web page based at least in part on the user right;
    in the event it is determined that the current user is to be limited to editing a selected portion of content of the web page, displaying to the user a first interface that comprises a first content view of the web page that enables the current user to edit the selected portion of content data but neither other portions of content nor an associated layout data of the web page;
    in the event it is determined that the current user is to be limited to editing all content of the web page, displaying to the user a second interface that comprises a second content view of the web page that enables the current user to edit all content data but not the layout data of the web page;
    in the event it is determined that the current user is not to be limited to editing the web page, displaying to the user a third interface that comprises a layout view of the web page that enables the current user to edit both the content data and the layout data of the web page;
    wherein the layout view comprises a set of layout components and wherein the set of layout components are hierarchical with a parent layout component and a child layout component;

receiving a request from the current user for editing an element within the layout view;

in the event it is determined that the layout of the element and the content of the element is locked, returning an exception to indicate the request is denied;

in the event it is determined that the layout of the element but not the content of the element is locked, allowing only the content of the element to be edited;

in the event it is determined that the layout of the element and the content of the element is not locked, allowing both layout and content of the element to be edited;

wherein the layout of the element is locked if its parent layout component is locked;

receiving a request from the current user to lock;

in the event it is determined that the user wants to lock the entire web page, locking a top level layout component and extending locking down to all children of the top level layout component; and in the event it is determined that the user selects a specific group of layout components and content to be locked and determined that the lock should be extended to children layout components, locking the selected components and extending locking down to all children of the selected components.

2. A method as recited in claim 1, wherein the layout view displays at least a portion of the layout data of the web page as a set of layout components each indicated by an associated layout component border.

3. A method as recited in claim 1, wherein the layout data and the content data are grouped and organized hierarchically.

4. A method as recited in claim 1, wherein the layout data are grouped into components and organized hierarchically; and the current user can be limited to editing a subset of the content that are children to a selected layout component.

5. A method as recited in claim 1, wherein the first interface and third interface are online interfaces.

6. A system comprising:
a processor configured to:
identify a current user of an application server;
automatically determine a job function associated with the current user by checking a repository where user information resides;
determine a user right of the current user based at least in part based on the job function;
determine whether the current user is to be limited to editing the web page based at least in part on the user right;
in the event it is determined that the current user is to be limited to editing a selected portion of content of the web page, displaying to the user a first interface that comprises a first content view of the web page that enables the current user to edit the selected portion of content data but neither other portions of content nor an associated layout data of the web page;
in the event it is determined that the current user is to be limited to editing all content of the web page, displaying to the user a second interface that comprises a second content view of the web page that enables the current user to edit content data but not the layout data of the web page;
in the event it is determined that the current user is not to be limited to editing the web page, displaying to the user a third interface that comprises a layout view of the web page that enables the current user to edit both the content data and the layout data of the web page;

wherein the layout view comprises a set of layout components and wherein the set of layout components are hierarchical with a parent layout component and a child layout component;

receive a request from the current user for editing an element within the layout view;

in the event it is determined that the layout of the element and the content of the element is locked, returning an exception to indicate the request is denied;

in the event it is determined that the layout of the element but not the content of the element is locked, allowing only the content of the element to be edited;

in the event it is determined that the layout of the element and the content of the element is not locked, allowing both layout and content of the element to be edited;

wherein the layout of the element is locked if its parent layout component is locked;

receive a request from the current user to lock;

in the event it is determined that the user wants to lock the entire web page, locking a top level layout component and extending locking down to all children of the top level layout component; and in the event it is determined that the user selects a specific group of layout components and content to be locked and determined that the lock should be extended to children layout components, locking the selected components and extending locking down to all children of the selected components.

7. A system as recited in claim 6, wherein the layout view displays at least a portion of the layout data of the web page as a set of layout components each indicated by an associated layout component border.

8. A system as recited in claim 6, wherein the layout data are grouped into components and organized hierarchically; and the current user can be limited to editing a subset of the content that are children to a selected layout component.

9. A system as recited in claim 6, wherein the first interface and third interface are online interfaces.

10. A system as recited in claim 6, wherein the system further comprises a repository in which the user information used to determine whether a current user is to be limited to editing content is stored.

11. A computer program product for selectively restricting changes to a web page, the computer program product being embodied in a non-transitory computer readable storage medium and comprising computer instructions for:
identifying a current user of an application server;
automatically determining a job function associated with the current user by checking a repository where user information resides;
determining a user right of the current user based at least in part based on the job function;
determining whether the current user is to be limited to editing the web page based at least in part on the user right;
in the event it is determined that the current user is to be limited to editing a selected portion of content of the web page, displaying to the user a first interface that comprises a first content view of the web page that enables the current user to edit the selected portion of content data but neither other portions of content nor an associated layout data of the web page;
in the event it is determined that the current user is to be limited to editing all content of the web page, displaying to the user a second interface that comprises a second content view of the web page that enables the current user to edit content data but not the layout data of the web page;

in the event it is determined that the current user is not to be limited to editing the web page, displaying to the user a third interface that comprises a layout view of the web page that enables the current user to edit both the content data and the layout data of the web page;

wherein the layout view comprises a set of layout components and wherein the set of layout components are hierarchical with a parent layout component and a child layout component;

receiving a request from the current user for editing an element within the layout view;

in the event it is determined that the layout of the element and the content of the element is locked, returning an exception to indicate the request is denied;

in the event it is determined that the layout of the element but not the content of the element is locked, allowing only the content of the element to be edited;

in the event it is determined that the layout of the element and the content of the element is not locked, allowing both layout and content of the element to be edited;

wherein the layout of the element is locked if its parent layout component is locked;

receiving a request from the current user to lock;

in the event it is determined that the user wants to lock the entire web page, locking a top level layout component and extending locking down to all children of the top level layout component; and in the event it is determined that the user selects a specific group of layout components and content to be locked and determined that the lock should be extended to children layout components, locking the selected components and extending locking down to all children of the selected components.

12. A computer program product as recited in claim 11, wherein the layout view displays at least a portion of the layout data of the web page as a set of layout components each indicated by an associated layout component border.

13. A computer program product as recited in claim 11, wherein the layout data are grouped into components and organized hierarchically; and the current user can be limited to editing a subset of the content that are children to a selected layout component.

14. A method as recited in claim 1, further comprising determining whether the associated layout data of the web page or a currently selected component thereof is locked based on the job function; and in the event it is determined that the layout is locked, to configure an interface displayed to the current user to allow the current user to edit a content of the web page or the currently selected component thereof if the content is not also locked.

15. A system as recited in claim 6, wherein the processor is further configured to determine whether the associated layout data of the web page or a currently selected component thereof is locked based on the job function; and in the event it is determined that the layout is locked, to configure an interface displayed to the current user to allow the current user to edit a content of the web page or the currently selected component thereof if the content is not also locked.

16. A computer program product as recited in claim 11, further comprising determining whether the associated layout data of the web page or a currently selected component thereof is locked based on the job function; and in the event it is determined that the layout is locked, to configure an interface displayed to the current user to allow the current user to edit a content of the web page or the currently selected component thereof if the content is not also locked.

17. A method as recited in claim 1, further comprising receiving a notification that the current user logs on to an enterprise website internally, wherein identifying the current user is based at least in part on receiving.

18. A system as recited in claim 6, wherein the processor is further configured to receive a notification that the current user logs on to an enterprise website internally, wherein identifying the current user is based at least in part on receiving.

19. A computer program product as recited in claim 11, further comprising receiving a notification that the current user logs on to an enterprise website internally, wherein identifying the current user is based at least in part on receiving.

* * * * *